(12) United States Patent
Koch et al.

(10) Patent No.: US 12,580,462 B2
(45) Date of Patent: Mar. 17, 2026

(54) METHOD FOR PRODUCING AN ELECTRICAL SHEET FOR AN ELECTRIC MACHINE

(71) Applicant: Ford Global Technologies, LLC, Dearborn, MI (US)

(72) Inventors: Raphael Koch, Odenthal (DE); Viktor Haeuser, Burscheid (DE)

(73) Assignee: Ford Global Technologies, LLC, Dearborn, MI (US)

( * ) Notice: Subject to any disclaimer, the term of this patent is extended or adjusted under 35 U.S.C. 154(b) by 405 days.

(21) Appl. No.: 17/882,145

(22) Filed: Aug. 5, 2022

(65) Prior Publication Data

US 2023/0041608 A1    Feb. 9, 2023

(30) Foreign Application Priority Data

Aug. 6, 2021    (DE) .......................... 102021120513.1
Aug. 2, 2022    (DE) .......................... 102022119376.4

(51) Int. Cl.
*H02K 15/02*        (2025.01)
*H02K 1/12*         (2006.01)
*H02K 1/22*         (2006.01)

(52) U.S. Cl.
CPC .............. *H02K 15/02* (2013.01); *H02K 1/12* (2013.01); *H02K 1/22* (2013.01)

(58) Field of Classification Search
CPC ............ H02K 15/02; H02K 1/12; H02K 1/22; H02K 1/06; H02K 1/02; Y10T 29/49012; Y10T 29/49165
See application file for complete search history.

(56) References Cited

U.S. PATENT DOCUMENTS

| | | | | |
|---|---|---|---|---|
| 7,378,052 | B2 * | 5/2008 | Harryson ................ | B22F 12/17 425/375 |
| 8,749,338 | B2 * | 6/2014 | Takahashi ........... | H01F 27/2804 336/200 |
| 11,065,857 | B2 * | 7/2021 | Zhu ........................ | H02K 15/03 |
| 11,462,344 | B2 * | 10/2022 | Adharapurapu .......... | B22F 1/05 |

(Continued)

FOREIGN PATENT DOCUMENTS

| | | |
|---|---|---|
| DE | 102011109129 | 1/2013 |
| DE | 102016119654 | 4/2018 |

(Continued)

OTHER PUBLICATIONS

Examination Report issued in corresponding DE Application 102021120513.1, issued Mar. 4, 2022.

(Continued)

*Primary Examiner* — Donghai D Nguyen
(74) *Attorney, Agent, or Firm* — Burris Law, PLLC

(57) ABSTRACT

An electrical sheet includes an electrical sheet main body produced by additive manufacturing (a 3D screen printing method) from at least a first and a second material. The first and second materials have magnetic properties which differ from one another, and first and second domains are formed in the electrical sheet main body from the first and second materials respectively. An electric machine is also provided. An electric machine and a method for producing an electrical sheet for use in a stator or rotor of an electric machine are also provided.

20 Claims, 4 Drawing Sheets

(56)  References Cited

U.S. PATENT DOCUMENTS

2007/0252871 A1*  11/2007  Silverbrook ............ B22F 12/53
                                                              347/54
2013/0076193 A1*   3/2013  Kim ......................... H02K 1/02
                                                              310/216.004
2020/0188996 A1     6/2020  Sethuraman et al.

FOREIGN PATENT DOCUMENTS

DE        102019123745       3/2020
EP            3708938 A1 *   9/2020
WO         2020099052        5/2020

OTHER PUBLICATIONS

Wikipedia, Selektives Lasersintern, Feb. 16, 2022, available at https://de.wikipedia.org/w/index.php.

* cited by examiner

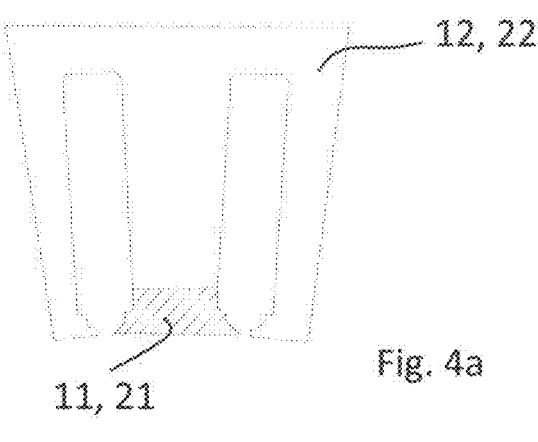
12, 22
11, 21                    Fig. 4a
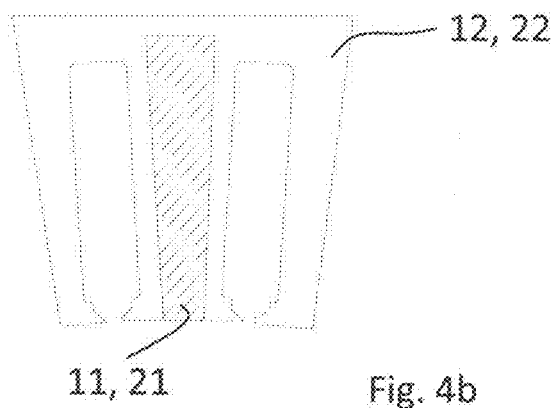
12, 22
11, 21                    Fig. 4b
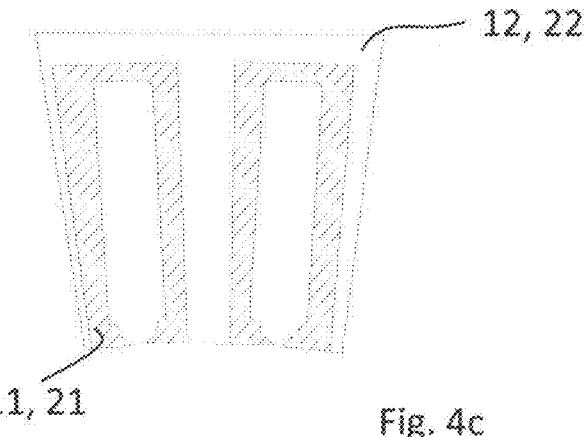
12, 22
11, 21                    Fig. 4c

METHOD FOR PRODUCING AN ELECTRICAL SHEET FOR AN ELECTRIC MACHINE

CROSS-REFERENCE TO RELATED APPLICATIONS

This application claims priority to and the benefit of German Patent Application Nos. DE 102021120513.1, filed on Aug. 6, 2021, and DE 102022119376.4, filed Aug. 2, 2022. The disclosures of the above-referenced applications are incorporated herein by reference.

FIELD

The present disclosure relates to an electrical sheet for use in a stator or rotor of an electric machine, and to an electric machine as such. Furthermore, the disclosure relates to a method for producing an electrical sheet.

BACKGROUND

The statements in this section merely provide background information related to the present disclosure and may not constitute prior art.

Electrical sheets are used to produce magnetic circuits for electric machines. Electric machines convert mechanical energy into electrical energy (generator) and vice versa (motor). Accordingly, electric machines are often referred to as energy converters. Every electric machine has at least one stationary and one moving element, in the case of rotating machines these are the so-called stator and rotor.

Electric machines are generally made up of windings which are arranged in various ways and through which electric current flows. The magnetic flux occurring in this process is guided in a targeted manner in a magnetic circuit, also known as an iron core. This core consists of materials that can conduct the magnetic flux, for example consists of layered electrical sheets. The layering of electrical sheets serves to reduce eddy currents. In technical jargon, "electrical sheets" are also referred to as magnetic sheets and, depending on the intended use, as dynamo or motor sheets or transformer sheets.

As standard, electrical sheets are manufactured by stamping individual sheets. To reduce eddy currents, electrical sheets have layer thicknesses of 200 to 300 μm. However, punching electrical sheets in the stated layer thickness range is a technically complex process.

Electrical sheets are of a monolithic design as standard, i.e., they are manufactured in one piece from a specific soft-magnetic material. The stamping of single sheets is limited to the production of 1-component electrical sheets, i.e., electrical sheets produced in this way are made of one specific material (in one form an alloy). For flexible adaptation to the installation space conditions present in a rotor or stator and to improve the conduction of the magnetic flux, the manufacture of hybrid electrical sheets, i.e., electrical sheets made of several materials, seems to be of particular interest.

These and other issues related to electrical sheets are addressed by the present disclosure.

SUMMARY

This section provides a general summary of the disclosure and is not a comprehensive disclosure of its full scope or all of its features.

In one form, the present disclosure provides an electrical sheet for use in a stator or rotor of an electric machine, where the electrical sheet having improved magnetic flux conductivity. The disclosure also provides an electric machine having improved magnetic flux conductivity and provides a method for producing an electrical sheet, wherein the method enables the production of electrical sheets from different materials.

The present disclosure relates firstly to an electrical sheet for use in a stator or rotor of an electric machine, comprising an electrical sheet main body which is produced by additive manufacturing from at least a first and a second material, wherein the first and second materials have magnetic properties which differ from one another, and wherein first and second domains are formed in the electrical sheet main body from the first and second materials respectively.

Depending on the use of the electrical sheet, in one form in a stator or a rotor, the electrical sheet main body can have a basic shape adapted to the particular use. The electrical sheet main body can, in one form, be plate-like or disk-like and can have a layer thickness of 100 to 800 μm, in particular 200 to 350 μm, wherein recesses, hole openings, structures or the like can be formed in the electrical sheet main body. The recesses, hole openings, structures or the like formed in an individual electrical sheet can vary in their shape and size. Recesses and hole openings may be provided when the electrical sheet is used in a stator or rotor, in one form for passing cooling channels therethrough. Furthermore, recesses, hole openings, structures or the like may be provided in the electrical sheet main body for stability reasons or for improving the conduction of the magnetic flux.

The mentioned domain-wise distribution of the first and second materials in the electrical sheet main body is also provided to improve the magnetic flux. Since the first and second materials have different magnetic properties (in one form magnetic conductivity and/or magnetizability), the domain-wise distribution of the first and second materials in the electrical sheet main body can be adapted or modified to the desired magnetic flux requirements in a functional use in a rotor or stator. Those points of the electrical sheet main body which experience a high magnetic flux in a functional use of the electrical sheet in a rotor or stator can be formed from a material adapted to this high magnetic flux or improved in its magnetic properties in this respect. At the same time, those points of the electrical sheet main body which experience a low magnetic flux when the electrical sheet is used functionally in a rotor or stator can be formed from a material adapted to this low magnetic flux or improved in its magnetic properties in this respect.

The term "domain" is to be understood in the present context in the sense of a "region", which means that the electrical sheet main body is formed in certain "regions" (domains) from the first material and in certain "regions" (domains) from the second material. It should be emphasized that the manufacture of the electrical sheet main body is not limited to two materials, but more than two materials may also be used to form the electrical sheet main body. These additional materials may also have different magnetic properties.

Since the exclusive (monolithic) formation of electrical sheets from a single high-performance material improved in terms of its magnetic properties (in one form high magnetic induction) would be associated with high costs, the multi-material approach according to the disclosure together with a functionally appropriate layout (arrangement of the high-performance material only at those points of the electrical sheet where the magnetic properties of the high-performance material have a positive effect on the functionality or performance of the rotor or stator or the electric machine) is associated with inherent cost advantages.

In the present context, "additive manufacturing" can be understood in particular to mean a 3D printing process in which materials are layered successively, i.e., one after the other, to form a three-dimensional object (in this case the electrical sheet main body). A key aspect of the present disclosure is that a plurality of materials (in one form, two materials) are used by additive manufacturing to form the electrical sheet main body. Materials that cannot be machined by conventional mechanical processing (in one form, a punching operation), such as brittle materials (this is often the case with metal alloys having a high silicon content), can thus also be used to manufacture an electrical sheet. Metal materials, such as metal alloys, can be processed by additive manufacturing (e.g., 3D printing) by first melting the metal material intended for 3D printing and present in powder form, and then layering the molten material to form the corresponding shape of the object to be manufactured. The arrangement of the domains in the electrical sheet main body can follow a predefined pattern, which can be symmetrically structured. According to the specified pattern, the domains are layered from the first and second materials (and in one form other materials).

The electrical sheets according to the disclosure can be manufactured with a low layer thickness (in one form a sheet thickness of approximately 200-350 μm) and allow efficient conduction of the magnetic flux when the electrical sheets are used in an electric machine (in one form a rotor or stator of an electric machine). Furthermore, electrical sheets according to the disclosure may be composed of several components of different materials. In one form, an electrical sheet may be made of a material with high magnetic induction and a material with lower magnetic induction, thereby providing an electrical sheet with magnetic flux properties improved with respect to a use. Additive manufacturing of the electrical sheet allows the materials used to be placed at designated and selected positions of the electrical sheet already at the time of manufacture of the electrical sheet. In addition, additive manufacturing allows the production of thin multi-component electrical sheets from materials that are difficult to machine mechanically, in one form brittle materials.

Further forms of the electrical sheet proposed by the disclosure are described below. It should be expressly noted that the features described below in relation to the electrical sheet proposed with the disclosure may readily also be design features of the electric machine or method proposed with the disclosure, and vice versa.

According to a first form of an electrical sheet proposed with the disclosure, it may be provided that the first and second materials have different magnetic conductivity and/or magnetizability. By processing materials having specific or selected properties (in particular magnetic properties), the electrical sheets can be improved or tailored with respect to specific desired requirements/properties for use of the electrical sheets in a specific electric machine. The manufacture of the electrical sheets can be preceded by a simulative design of the electrical sheets. In this process, the magnetic flux conditions present in a specific electric machine can be ascertained and the associated (improved) desired requirements for the magnetic properties of the electrical sheets used in the electric machine can be determined. Based on this, the additive manufacturing of the electrical sheet can be performed.

According to a further form of an electrical sheet proposed by the disclosure, it may be provided that the first material and the second material each comprise a metal alloy. Also, the first material and/or the second material may each comprise a plurality of metal alloys of different composition. In one form, the first material and the second material comprise metal alloys which differ from one another, e.g., metal alloys composed of different elements/components. In addition to the metal alloys, the first material and/or the second material may comprise further constituents (in one form solvents, thickeners, dispersants, fillers, binders or other additives). The first and second materials may also differ in the further constituents. The use of metal alloys in electrical sheets is known from the prior art, but not the use of different metal alloys to produce an electrical sheet composed of at least two materials. A metal alloy is understood to be a material consisting of at least two elements or components, of which at least one element or component is a metal.

According to a further form of an electrical sheet proposed by the disclosure, it may be provided that the first material comprises an iron-cobalt alloy, and that the second material comprises an iron-silicon alloy. Iron-cobalt alloys as well as iron-silicon alloys belong to the group of soft-magnetic materials, which can be easily magnetized in an external magnetic field. Magnetic polarization can be generated, in one form, by an electric current in a current-carrying coil or by the presence of a permanent magnet. In such soft-magnetic materials, the polarization leads to a magnetic flux density many times higher than that generated by an external magnetic field in air. A soft-magnetic material thus amplifies an external magnetic field by the material permeability. The use of iron-silicon alloys as materials for electrical sheets is well known. Such alloys have maximum magnetic saturation at about 2.0 T. Materials such as iron-cobalt alloys, on the other hand, have a higher magnetic saturation, which lies at approximately 2.25 T.

The novel combination of an electrical sheet main body formed by domains of an iron-cobalt alloy and domains of an iron-silicon alloy is not suitable for manufacture using known mechanical processes. The proposed additive manufacturing of the electrical sheet, on the other hand, allows such a combination of materials.

According to a further form of an electrical sheet proposed with the disclosure, it can be provided that the first and second domains are arranged in such a way that the electrical sheet has an improve conduction behavior with respect to a magnetic flux when used in the stator or rotor. Depending on the design of the electrical sheet and depending on the structural situation present in the electric machine (including the conditions present in the electric machine with respect to the magnetic flux), the electrical sheet can be manufactured with a tailored distribution of domains of the first and second materials (depending on certain magnetic properties) in order to meet the desired requirements or to modified to a desired magnetic flux.

It should be mentioned that the torque that can be generated can be increased by improving the magnetic flux in a rotating electric machine. By arranging materials with high magnetic induction in specific areas (domains) of the electrical sheet and thus of the electric machine, the magnetic flux is improved. The selective or specific use of materials with advantageous magnetic properties, such as iron-cobalt alloys, in hybrid (multi-component) electrical sheets, on the one hand saves material costs (iron-cobalt alloys are highly expensive), and on the other hand increases the performance or output of the electric machine. Ultimately, on the one hand the efficiency of an electric machine can be improved, and on the other hand the size or volume of the electric machine can be reduced while maintaining the same performance characteristics. By using such electrical sheets, electric machines can thus be designed to be more compact.

According to a further form of an electrical sheet proposed by the disclosure, it may be provided that the electrical sheet main body is produced by an additive printing process, and further in one form by a 3D screen printing process. The additive printing process is in one form a 3D printing process e.g., a process for printing a body (the electrical sheet main body) extending in three dimensions (spatial directions). In particular, manufacturing by a 3D screen printing process (also called screen printing) is considered in the present case. Such manufacturing techniques allow scaling to the manufacture of high volumes of electrical sheets, and can also be flexibly adapted to modified designs or geometries of the component to be manufactured. The additive manufacturing processes proposed here can be carried out with a high degree of automation, if not fully automated. Details of the manufacturing process will be explained in more detail later.

According to a further form of an electrical sheet proposed by the disclosure, it may be provided that the electrical sheet is composed of one- or multi parts, wherein the electrical sheet is in particular structured segmentally. A segmented structure of an electrical sheet means that the electrical sheet or the electrical sheet main body is composed of multiple segments. The segments may each contact neighbored segments/abut thereto or be placed in distance thereto. Such a segmented electrical sheet may be fabricated by a 3D screen printing process. By this, fabrication of segmented stators and/or segmented rotors may be provided by 3D screen printing. The smaller dimensions of the segments (when compared to a single-part electrical sheet) are in particular advantageous for the shrinking behavior of the electrical sheets during sintering. The width to thickness ratio (of the segments of the electrical sheet) can thus be reduced by a factor of 5 to 10 compared with a single-part electrical sheet, which has positive effects on sintering distortion.

As mentioned, the present disclosure relates not only to an electrical sheet, but also to an electric machine having a rotor and a stator, wherein the rotor and stator each have at least one laminated core with electrical sheets, wherein the electrical sheets of the at least one laminated core associated with the rotor and/or stator are formed according to the disclosure. The laminated cores may additionally comprise cooling channels in which a coolant flows. As mentioned, when the electrical sheets according to the disclosure are used in an electric machine, the performance thereof can be considerably increased. In one form, the inventors of the present disclosure have found that in an electric machine of an MHT motor, torques up to 10% higher can be generated at maximum power by using electrical sheets provided with domains of an iron-cobalt alloy and domains of an iron-silicon alloy.

Furthermore, the present disclosure relates to a method for producing a one- or multipart electrical sheet, in particular a segmented electrical sheet, wherein an electrical sheet main body is formed by additive manufacturing from at least a first and a second material, wherein the first and second materials have magnetic properties which differ from one another, the additive manufacturing of the electrical sheet main body comprising:

a. defining a target geometry of the electrical sheet main body, wherein the target geometry comprises a distribution of first and second domains of the first and second materials, respectively, in the electrical sheet main body;

b. successively layering layers of a first and second coating mass to form a main body blank, wherein the first coating mass comprises the first material and the second coating mass comprises the second material, and wherein the first and second coating masses are layered such that the main body blank has the distribution of the first and second domains of the first and second materials, respectively, corresponding to the target geometry;

c. sintering the main body blank.

It should be mentioned that in step b., following the layering of a layer of the first or second coating compound, intermediate drying can be carried out to dry or surface-dry the particular layer. Following the intermediate drying, the layering process can be continued. Such intermediate drying inhibits smearing and mixing at the interfaces of the domains. The contour of the electrical sheet to be produced is thus also preserved. Following step b., i.e., upstream of the sintering, a final drying can be carried out.

The determination of a target geometry of the electrical sheet main body mentioned in step a. can be performed simulatively, i.e., by simulating the magnetic flux conditions in an electric machine (in one form in the stator or rotor) in which the electrical sheet to be produced is to be used. Then, the performance of the electrical sheet can be improved with respect to certain boundary conditions, in one form the magnetic conduction behavior, in the electric machine. For this purpose, different variables/parameters relating to the electrical sheet can be varied and their influence on the boundary conditions to be improved analyzed. Possible variables can relate to the basic geometry, size, thickness and material, including material properties of the electrical sheet. Structures, recesses, cutouts, hole openings, etc. provided in the electrical sheet can also represent corresponding variables. In particular, the local (spatial) distribution or arrangement of the first material (or domains thereof) and of the second material (or domains thereof), i.e., in particular the iron-cobalt alloy and the iron-silicon alloy, in the electrical sheet main body can represent a variable to be improved. The simulative determination of the target geometry can thus be based on the evaluation of one or more of the aforementioned variables with respect to specific boundary conditions. The simulation can be based on a suitable software, an algorithm, or on a finite element method. Likewise, a sintering simulation can be used to evaluate the compatibility of the alloys used, such as shrinkage behavior with the resulting residual stresses, etc.

A first or second "coating mass" is understood to mean a substance or substance mixture that contains the first or second material and in one form other additives, but is present in a form that is accessible and processable for additive manufacturing (in particular 3D screen printing).

In the case of 3D screen printing (which is one form of the process in accordance with the disclosure for producing the electrical sheet main body), the first and second coating masses are in one form present in the form of respective suspensions, in which the particular metal alloy is contained in powder form. A suspension comprises a liquid with solid particles distributed therein (in this case the powder of the metal alloys). The powder is thus surrounded by a suspending agent. The suspending agent may be based on an aqueous or organic medium. The coating mass may additionally comprise thickeners, fillers, binders or other additives or substances to influence the flow behavior or other properties. Before the first and second coating masses are layered, the materials are thus brought into a state (in this case the suspension) that can be processed by additive manufacturing (in particular 3D screen printing).

The layering is in one form carried out on a substrate (a carrier plate) on which the first and second coating mass is layered. If the first and/or second coating mass is already layered on the substrate, further substrate can also be layered directly on the first and/or second coating mass. The substrate can be plate-shaped, in particular planar. A frame corresponding to the contour of the target geometry of the electrical sheet main body can optionally be formed or arranged on the substrate in order to hold the layered coating material in position.

In the 3D screen printing process, the first and second coating masses (in one form in the form of suspensions or in some other flowable form) can be layered through different screens in successive levels to be formed. In this process, the three-dimensional shape of the main body blank is built up successively in layers. Screens can be used here to form the shape and the regions or domains to be formed in a level (from different materials or associated coating materials) in layers. It can be provided that individual layers are layered only from the first coating mass and other layers are layered only from the second coating mass.

Specifically, the layering of the first and second coating masses in the 3D screen printing process can be carried out as follows: The coating mass (in the form of a suspension) is applied to the substrate using a doctor blade through a screen, in one form a fine-mesh fabric. At those points of the fabric where, according to the target geometry of the electrical sheet, no coating mass is to be printed, the mesh openings of the fabric are closed (made impermeable) by a template. The mesh can support the template. During printing, the template can be changed. The template may be made of plastic, in one form. Also, the template may be made of steel grids ("mesh") or laser-perforated steel sheets. The template can be manufactured as a specially manufactured template body and arranged on the screen. Depending on the target geometry of a level to be applied (layer), the template body can be exchanged, in one form by an automatic exchange unit. It is also conceivable to use a two-part or multi-part template body when applying a level/layer, which allows the layering of two different coating masses in one and the same level.

To form the template, the surface of a stretched fabric (screen) can alternatively be coated with a photopolymer and exposed via a positive film with a motif corresponding to the target geometry of the electrical sheet to be printed. The photopolymer hardens in the areas not to be printed, and the unexposed material is removed (in one form washed out). During printing, the coating mass passes through towards the substrate only at the areas of the fabric (screen) that are free from the template. For printing, a plurality of such fabric template agglomerates can be used and changed according to the target geometry of each layer to be printed. This can be done in automated fashion via an exchange unit. The exchange unit can be part of a printing device used to carry out the printing process, in particular a screen printing device.

After layering the coating mass to form a main body blank (or after the formation of a level or layer of coating mass), the blank or a corresponding layer thereof can be at least partially dried, solidified, thickened or hardened. This can be actively assisted. Here, a formed layer (level) may undergo drying in air, but may also, as it were, be subjected to active drying (in one form, by the use of infrared radiators (non-inductive), blowers, gas drying by air or inert gas, an increase in ambient temperature or irradiation with electromagnetic radiation). This causes evaporation of the suspending agent or chemical cross-linking reactions of chemical binders or cross-linking agents contained in the coating mass. The drying can be interposed between the layering of different levels. Similarly, drying may occur after complete layering of the first and second coating masses to form the main body blank. The dried main body blank may be referred to as a green body or green compact.

During sintering, the main body blank is subjected to thermal treatment. This can be carried out in stages (in one form at different temperatures). During thermal treatment, any suspension agent or other additives (in one form binders) remaining in the main body blank can be removed, in particular by thermal decomposition. During sintering, the main body blank is heated to a temperature below the melting temperature, in one form to a temperature range that is 10-20% below the melting temperature. During sintering, the material of the main body blank compacts. Following the sintering process, the electric sheet main body produced is cooled. Cooling can be by air or gas cooling. Cooling by reducing the ambient temperature or by applying a cooling medium is also conceivable.

Before or after sintering, the main body blank or the electrical sheet main body can be cleaned, in one form by air, $CO_2$ cleaning, water, a suitable solvent or by sandblasting.

For sintering, the main body blank can be removed from the substrate and placed on a sintering support that can withstand the high sintering temperatures. To facilitate the separation of the main body blank from the substrate, a release agent can be provided between the substrate and the main body blank. The sintering support can be a ceramic. Before sintering, a release agent can also be placed between the sintering support and the main body blank to be sintered, and facilitates removal of the electrical sheet main body after sintering.

In accordance with the method, it can also be provided that the main body blank is post-treated, in particular coated or impregnated, following the sintering or cooling step.

The method is also configured to fabricate individual segments of an electrical sheet, the segments together forming the electrical sheet. Furthermore, it is even possible to fabricate entire segments of a stator and/or rotor by the proposed method. In the latter case, a time-consuming layer-wise building-up of individual electrical sheets to form a stator/rotor would be avoided, and only the assembly of the segments would be required.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

The disclosure is further explained in more detail with reference to the following figures. These are to be understood merely as examples and are not intended to limit the disclosure to the exemplary embodiments shown.

Figure 3:
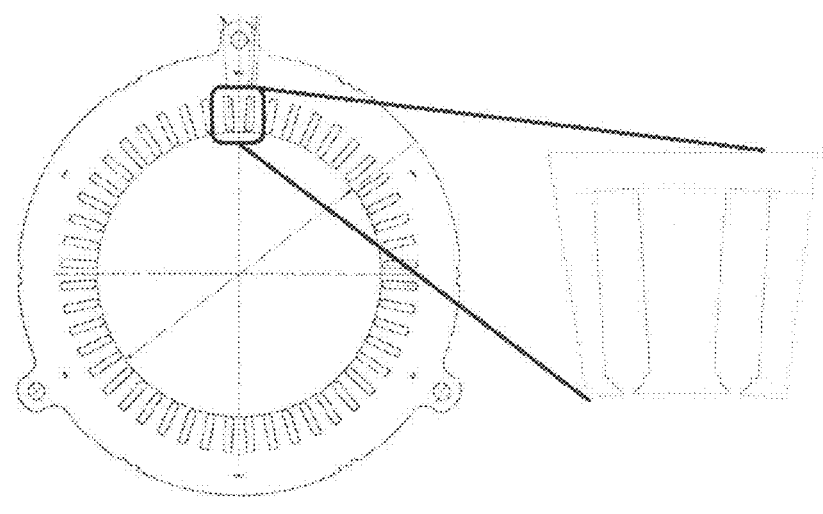
FIG. 3 shows a schematic representation of an electrical sheet for use as a stator in an electric machine, including an enlarged detail, according to the teachings of the present disclosure.
Figure 5:
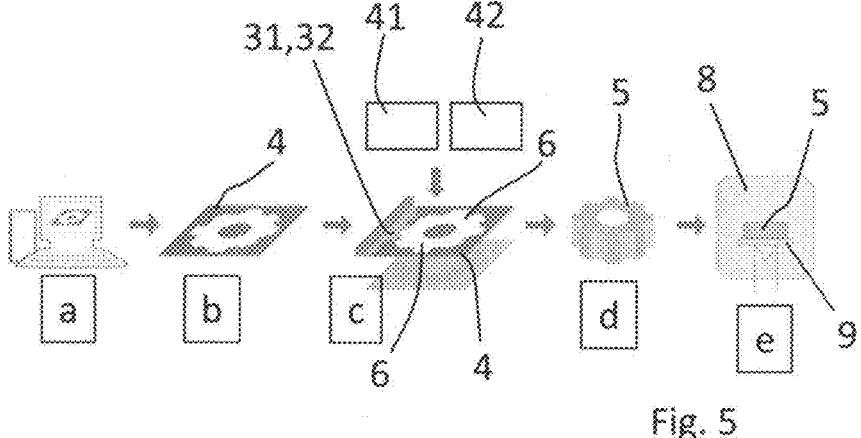

FIG. 4*a* show a schematic representation of the enlarged detail from FIG. 3, showing one formation of first and second domains of a first and second material in the electrical sheet according to the teachings of the present disclosure;

FIG. 4*b* shows a schematic representation of the enlarged detail from FIG. 3, showing another formation of the first and second domains of the first and second material in the electrical sheet according to the teachings of the present disclosure;

FIG. 4*c* show a schematic representation of the enlarged detail from FIG. 3, showing yet another formation of the first and second domains of the first and second material in the electrical sheet according to the teachings of the present disclosure; and FIG. 5 shows a schematic representation of a method for producing an electrical sheet, according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
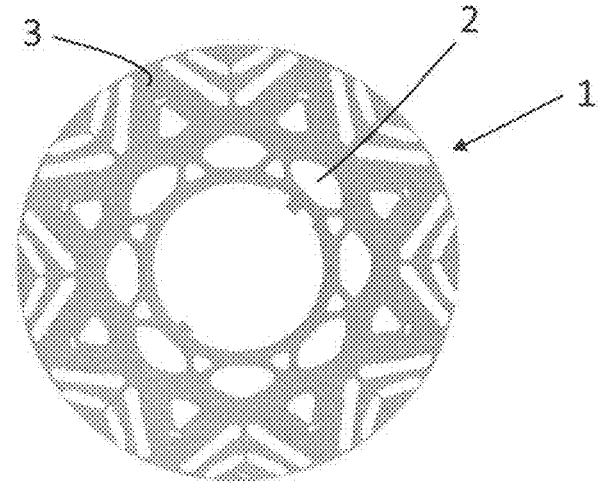
FIG. 1 shows a schematic representation of an electrical sheet for use as a rotor in an electric machine, according to the teachings of the present disclosure.
Figure 2:
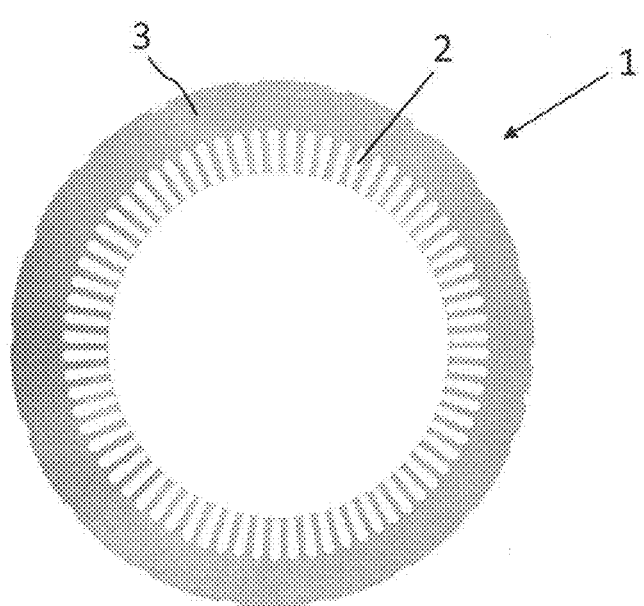
FIG. 2 shows a schematic representation of an electrical sheet for use as a stator in an electric machine, according to the teachings of the present disclosure.

FIG. 1 shows an electrical sheet 1 for use in a rotor of an electric machine, while FIG. 2 shows an electrical sheet 1 intended for use in a stator of an electric machine. Depending on the intended use (in one form in a rotor or stator), the electrical sheet 1 has a different geometric structure, which can have material recesses 2 formed in an electrical sheet main body 3. Since the geometry or design of electrical sheets 1 used in a rotor or stator can be varied, design variants in this respect will not be discussed further. The disclosure is applicable to a wide variety of geometries.

According to the disclosure, the electrical sheet main body 3 is manufactured by additive manufacturing (namely in a 3D screen printing process) from at least a first and a second material 11, 12. In so doing, the first and second materials 11, 12 have magnetic properties which differ from one another. As shown in FIGS. 4*a-c*, first domains 21 of the first material 11 and second domains 22 of the second material 12 are formed in the electrical sheet main body 3. FIGS. 4*a-c* show merely forms of arrangements of the domains 21, 22 in a detail of an electrical sheet main body 3 intended for use in a stator. The distribution of the domains 21, 22 of the first and second—materials 11, 12 can be adapted depending on the condition present in an electric machine, concerning, for example, the magnetic flux or the available installation space. FIGS. 4*a-c* show corresponding examples of possible variants of such a distribution of the first and second domains 21, 22. Here, the first material 11 may be an iron-cobalt alloy, and the second material 12 may be an iron-silicon alloy. The first domains 21 formed from the first material 11 (iron-cobalt) are shown hatched in FIGS. 4*a-c*.

The details of an electrical sheet 1 intended for use in a stator of an electric machine shown in FIGS. 4*a-c* correspond to the detail of the electrical sheet 1 highlighted in FIG. 3. Due to manufacture by a 3D screen printing process, the electrical sheets 1 can be flexibly adapted to the conditions present when used in the stator or rotor, in particular with a view to improved conduction behavior with respect to a magnetic flux.

FIG. 5 schematically shows the sequence of the 3D screen printing process for manufacturing an electrical sheet 1. In particular, an electrical sheet main body 3 is formed by a 3D screen printing process from at least a first and a second material 11, 12, wherein the first and second materials 11, 12 have magnetic properties which differ from one another. In a first step a., a target geometry of the electrical sheet main body 3 is determined, wherein the target geometry comprises a distribution of first and second domains 21, 22 of the first and second materials 11, 12, respectively, in the electrical sheet main body 3. The step of designing the target geometry is illustrated in FIG. 5 by a computer, on which the design process can be carried out simulatively. Subsequently, in a step b., a suitable screen 4 (in one form including a template) is made, which can be used in the screen printing of the electrical sheet main body 3 and which reproduces the target geometry of the electrical sheet main body 3. Thereupon, in a step c., a successive layering of a first and second coating mass 31, 32 is carried out to form a main body blank 6, wherein the first coating mass 31 comprises the first material 11 and the second coating mass 32 comprises the second material 12. The first coating mass 31 may be held in a first reservoir 41, while the second coating mass 32 may be held in a second reservoir 42. By suitable application devices (in one form nozzles), the first and second coating masses 31, 32, respectively, can be applied to the screen 4. The coating mass 31, 32 is conveyed through fabric openings of the screen 4 by a doctor blade, wherein the fabric openings of the screen 4 form a superordinate passage opening 7 in the screen 4, the contour of which corresponds to the target geometry of the electrical sheet main body 3. The first and second coating masses 31, 32 are layered in such a way that the main body blank 6 has the distribution of the first and second domains 21, 22 of the first and second materials 11, 12, respectively, corresponding to the target geometry. In the process, individual layers can be formed from the first or second coating mass 31, 32, or structures within a layer (level) can be formed by different coating masses, in one form the first and second coating mass 31, 32.

In a step d., a formed main body blank 5 is dried. Following the drying, the formed main body blank 5 is sintered. The sintering can take place in a furnace 8, wherein the formed main body blank 5 is arranged on a carrier 9 positioned in the furnace 8. After sintering, the formed electrical sheet main body 3 is cooled and, if desired, post-treated.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

It should be noted that the features listed individually in the claims may be combined with one another in any technically feasible manner (even across category boundaries, in one form, the electrical sheet, the electric machine, and the method) and indicate further forms of the disclosure. The description additionally characterizes and specifies the disclosure, particularly in conjunction with the figures.

It should also be noted that a conjunction "and/or" used herein that stands between and links two features is always to be interpreted such that in a first form of the subject matter according to the disclosure only the first feature may be present, in a second form only the second feature may be present, and in a third form both the first and second features may be present.

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for producing a one- or multi-part electrical sheet including a segmented electrical sheet, wherein an entire electrical sheet main body is formed by additive manufacturing, the method comprising:
defining a target geometry of the electrical sheet main body, wherein the target geometry comprises a distribution of first and second domains of a first material and a second materials, respectively, in the electrical sheet main body;
successively layering layers of a first and second coating mass to form a main body blank, wherein the first coating mass consists of a suspension of the first material and the second coating mass consists of a suspension of the second material, the first and second materials having magnetic properties that differ from one another, and wherein the first and second coating masses are layered such that the main body blank has the distribution of the first and second domains of the first and second materials, respectively, corresponding to the target geometry; and
sintering the main body blank.

2. The method according to claim 1, wherein the sintering is preceded by a drying of the main body blank.

3. The method according to claim 1, wherein the main body blank is cooled down following the sintering.

4. The method according to claim 1, wherein the main body blank is post-treated, following the sintering or cooling.

5. The method according to claim 1, wherein the first and second materials have at least one of different magnetic conductivity and magnetizability.

6. The method according to claim 1, wherein the first material and the second material each comprise a metal alloy.

7. The method according to claim 6, wherein the first material comprises an iron-cobalt alloy and the second material comprises an iron-silicon alloy.

8. The method according to claim 1 further comprising:
making a screen configured to be used in 3D Screen printing of the electrical main body and reproduce the target geometry of the electrical sheet main body; and
conveying the first and second coating masses through fabric openings of the screen, wherein the fabric openings from a superordinate passage opening in the screen, wherein the fabric openings form a contour that corresponds to the target geometry, and wherein the first and second coating masses are layered such that the main body blank has the distribution of the first and second domains of the first and second materials.

9. The method according to claim 8, wherein the conveying of the first and second materials through the fabric openings of the screen includes using a doctor blade coating method to convey the first and second materials.

10. The method according to claim 1 further comprising cooling, after the sintering, a formed electrical sheet main body.

11. The method according to claim 1, wherein the sintering takes place in a furnace, and wherein the main body blank is arranged on a carrier positioned in the furnace.

12. A method for producing a one- or multi-part electrical sheet including a segmented electrical sheet, wherein an entire electrical sheet main body is formed by additive manufacturing, the method comprising:
defining a target geometry of the electrical sheet main body, wherein the target geometry comprises a distribution of first and second domains of a first material and a second material, respectively, in the electrical sheet main body, the first material and the second material having magnetic properties that differ from one another, and the first material and the second material each comprising a suspension of a metal alloy;
conveying a first coating mass and a second coating mass through openings of a screen to form a main body blank,
layering the first and second coating masses such that the main body blank has the distribution of the first and second domains of the first and second materials, respectively, corresponding to the target geometry, the openings of the screen form a contour that corresponds to the target geometry, the first coating mass consists of the first material, and the second coating mass consists of the second material; and
sintering the main body blank.

13. The method according to claim 12, wherein the openings of the screen form a superordinate passage opening in the screen.

14. The method according to claim 12, wherein the conveying of the first coating mass and second coating mass through the openings of the screen includes using a doctor blade to convey the first coating mass and second coating mass.

15. The method according to claim 12, wherein the screen is a fine mesh fabric.

16. The method according to claim 12, further comprising arranging a template on the screen such that some of the openings of the screen are made impermeable by the template where no coating mass is to be printed according to the target geometry of the electrical sheet.

17. The method according to claim 16, further comprising changing a plurality of templates according to the target geometry of each layer to be printed.

18. The method according to claim 16, further comprising layering the first coating mass and the second coating mass in a single layer using a multi-part template body.

19. The method according to claim 12, further comprising forming a plurality of recesses in the electrical sheet main body during the layering.

20. The method according to claim 12, wherein the first material comprises an iron-cobalt alloy and the second material comprises an iron-silicon alloy.

* * * * *